US012223797B2

(12) United States Patent
Schoonmaker et al.

(10) Patent No.: US 12,223,797 B2
(45) Date of Patent: Feb. 11, 2025

(54) SLIDABLE GAMING CHAIR INCLUDING RETURN-TO-HOME FEATURE

(71) Applicant: Aristocrat Technologies, Inc., Las Vegas, NV (US)

(72) Inventors: Rena Schoonmaker, Las Vegas, NV (US); Mathew Wion, Las Vegas, NV (US); Daniel Waller, Reno, NV (US); Wendell Davis, Jr., Reno, NV (US); Edmond Abadie, Reno, NV (US); Dylan Nettenstrom, Sparks, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 426 days.

(21) Appl. No.: 17/709,146

(22) Filed: Mar. 30, 2022

(65) Prior Publication Data

US 2022/0366758 A1 Nov. 17, 2022

Related U.S. Application Data

(60) Provisional application No. 63/188,911, filed on May 14, 2021.

(51) Int. Cl.
*G07F 17/32* (2006.01)
*A47C 1/023* (2006.01)
(Continued)

(52) U.S. Cl.
CPC .......... *G07F 17/3216* (2013.01); *A47C 1/023* (2013.01); *A47C 1/0242* (2013.01);
(Continued)

(58) Field of Classification Search
CPC ............ G07F 17/3216; G07F 17/3223; G07F 17/3206; A47C 7/727; A47C 1/023; A47C 1/0242; A47C 1/03294; A47C 15/004
See application file for complete search history.

(56) References Cited

U.S. PATENT DOCUMENTS 39,370 A 8/1863 Alexander
4,582,324 A 4/1986 Koza
(Continued)

FOREIGN PATENT DOCUMENTS

AU 2019203135 A1 12/2019
GB 2573622 4/2019
(Continued)

OTHER PUBLICATIONS

Office Action (Non-Final Rejection) dated Aug. 30, 2022 for U.S. Appl. No. 17/222,763 (pp. 1-11).
(Continued)

*Primary Examiner* — Steve Rowland
(74) *Attorney, Agent, or Firm* — Armstrong Teasdale LLP

(57) ABSTRACT

An electronic gaming system is described. The electronic gaming system includes an upper assembly including a chair and at least one sensor. The electronic gaming system also includes a lower assembly coupled to the upper assembly by a support structure wherein the lower assembly includes a centering system and wherein the centering system is configured to return the chair to a predefined home position in response to the at least one sensor of the upper assembly detecting a weight below a predefined threshold.

18 Claims, 12 Drawing Sheets

(51) Int. Cl.
*A47C 1/024* (2006.01)
*A47C 1/032* (2006.01)
*A47C 7/72* (2006.01)
*A47C 15/00* (2006.01)

(52) U.S. Cl.
CPC .......... *A47C 1/03294* (2013.01); *A47C 7/727* (2018.08); *A47C 15/004* (2013.01); *G07F 17/3223* (2013.01); *G07F 17/3206* (2013.01)

(56) References Cited

U.S. PATENT DOCUMENTS

| | | | | |
|---|---|---|---|---|
| 5,283,422 | A | 2/1994 | Storch | |
| 5,326,104 | A | 7/1994 | Pease | |
| 5,605,334 | A | 2/1997 | McCrea, Jr. | |
| 5,643,086 | A | 7/1997 | Alcorn | |
| 5,735,742 | A | 4/1998 | French | |
| 5,970,143 | A | 10/1999 | Schneier | |
| 6,154,131 | A | 11/2000 | Jones, II | |
| 6,165,069 | A | 12/2000 | Sines | |
| 6,383,076 | B1 | 5/2002 | Tiedeken | |
| 6,460,848 | B1 | 10/2002 | Soltys | |
| 6,488,585 | B1 | 12/2002 | Wells | |
| 6,641,484 | B2 | 11/2003 | Oles | |
| 7,003,139 | B2 | 2/2006 | Endrikhovski | |
| 7,154,380 | B1 | 12/2006 | Tarrab, Jr. | |
| 7,168,089 | B2 | 1/2007 | Nguyen | |
| 7,316,615 | B2 | 1/2008 | Soltys | |
| 7,581,256 | B2 | 8/2009 | Cockerille | |
| 7,708,638 | B2 | 5/2010 | Enzminger | |
| 7,736,234 | B2 | 6/2010 | Cockerille | |
| 7,815,507 | B2 | 10/2010 | Parrott | |
| 7,951,003 | B2 | 5/2011 | Russell | |
| 8,157,647 | B2 | 4/2012 | House | |
| 8,303,417 | B2 | 11/2012 | Burke | |
| 8,366,542 | B2 | 2/2013 | White | |
| 8,407,147 | B2 | 3/2013 | Lenger | |
| 8,449,378 | B2 | 5/2013 | Michaelson | |
| 8,608,568 | B2 | 12/2013 | Carpenter | |
| 8,628,413 | B2 | 1/2014 | Lemay | |
| 8,657,674 | B2 | 2/2014 | Lemay | |
| 8,777,758 | B2 | 7/2014 | Anderson | |
| 8,801,517 | B2 | 8/2014 | Walker | |
| 8,917,971 | B2 | 12/2014 | Woods | |
| 8,944,910 | B1 | 2/2015 | Boyle | |
| 8,974,304 | B2 | 3/2015 | Gagner | |
| 9,033,791 | B2 | 5/2015 | Hamlin | |
| 9,084,937 | B2 | 7/2015 | Gadher | |
| 9,117,329 | B2 | 8/2015 | Osgood | |
| 9,117,339 | B2 | 8/2015 | Burke | |
| 9,269,216 | B2 | 2/2016 | Keilwert | |
| 9,325,203 | B2 | 4/2016 | Nguyen | |
| 9,367,991 | B2 | 6/2016 | Acres | |
| 9,616,324 | B2 | 4/2017 | Krenn | |
| 9,865,139 | B2 | 1/2018 | Walker | |
| 10,037,648 | B2 | 7/2018 | Acres | |
| 10,223,679 | B2 | 3/2019 | Lee | |
| 10,229,561 | B2 | 3/2019 | Cage | |
| 10,275,583 | B2 | 4/2019 | Leuthardt | |
| 10,297,106 | B1 | 5/2019 | Simons | |
| 10,322,727 | B1 | 6/2019 | Chan | |
| 10,425,426 | B1 | 9/2019 | Simons | |
| 10,497,204 | B2 | 12/2019 | Weber | |
| 10,530,569 | B2 | 1/2020 | Bisti | |
| 10,549,202 | B2 | 2/2020 | McCoy | |
| 10,706,678 | B2 | 7/2020 | Nguyen | |
| 10,741,017 | B2 | 8/2020 | Silva | |
| 10,824,759 | B1 | 11/2020 | Magerkurth | |
| 10,850,204 | B2 | 12/2020 | Bruzzo | |
| 10,943,438 | B2 | 3/2021 | Cage | |
| 10,949,417 | B2 | 3/2021 | Kurian | |
| 10,950,081 | B2 | 3/2021 | Baker | |
| 10,991,201 | B2 | 4/2021 | McDowell | |
| 11,004,304 | B2 | 5/2021 | Nguyen | |
| 11,023,981 | B2 | 6/2021 | Hu | |
| 11,045,726 | B2 | 6/2021 | Hennessy | |
| 11,107,321 | B2 | 8/2021 | Ovalle | |
| 11,158,170 | B2 | 10/2021 | Thomas | |
| 11,159,334 | B2 | 10/2021 | Kuzma | |
| 11,159,945 | B2 | 10/2021 | Obaidi | |
| 11,189,130 | B2 | 11/2021 | Purohit | |
| 11,195,371 | B2 | 12/2021 | Purohit | |
| 11,232,442 | B2 | 1/2022 | Liu | |
| 11,245,529 | B2 | 2/2022 | Clark | |
| 11,281,644 | B2 | 3/2022 | Shimamura | |
| 11,288,921 | B2 | 3/2022 | Haishima | |
| 11,308,761 | B2 | 4/2022 | Purohit | |
| 11,373,446 | B1 | 6/2022 | Beisel | |
| 11,373,480 | B2 | 6/2022 | Taylor | |
| 11,380,070 | B2 | 7/2022 | Koidahl | |
| 11,651,651 | B2 | 5/2023 | Purohit | |
| 11,688,233 | B2 | 6/2023 | Acres | |
| 11,783,669 | B2 | 10/2023 | Schwartz | |
| 2001/0019966 | A1 | 9/2001 | Idaka | |
| 2002/0025850 | A1 | 2/2002 | Hafezi | |
| 2002/0032051 | A1 | 3/2002 | Stockdale | |
| 2002/0138461 | A1 | 9/2002 | Sinclair | |
| 2002/0142831 | A1 | 10/2002 | Mattice | |
| 2002/0152120 | A1 | 10/2002 | Howington | |
| 2003/0032485 | A1 | 2/2003 | Cockerille | |
| 2003/0060283 | A1 | 3/2003 | Rowe | |
| 2004/0048669 | A1 | 3/2004 | Rowe | |
| 2004/0127277 | A1 | 7/2004 | Walker | |
| 2004/0235562 | A1 | 11/2004 | Kiely | |
| 2005/0043086 | A1 | 2/2005 | Schneider | |
| 2005/0054430 | A1 | 3/2005 | Pitman | |
| 2005/0130728 | A1 | 6/2005 | Nguyen | |
| 2006/0035713 | A1 | 2/2006 | Cockerille | |
| 2006/0063595 | A1 | 3/2006 | Kondo | |
| 2006/0100009 | A1 | 5/2006 | Walker | |
| 2006/0111172 | A1 | 5/2006 | Walker | |
| 2006/0166732 | A1 | 7/2006 | Lechner | |
| 2006/0189382 | A1 | 8/2006 | Muir | |
| 2006/0205488 | A1 | 9/2006 | Gagner | |
| 2006/0264253 | A1 | 11/2006 | Trobia | |
| 2007/0054734 | A1 | 3/2007 | Morrow | |
| 2008/0058059 | A1 | 3/2008 | Fitzsimons | |
| 2008/0167118 | A1 | 7/2008 | Kroeckel | |
| 2008/0182667 | A1 | 7/2008 | Davis | |
| 2008/0214300 | A1 | 9/2008 | Williams | |
| 2008/0235746 | A1 | 9/2008 | Peters | |
| 2009/0042640 | A1 | 2/2009 | Gagner | |
| 2009/0061987 | A1 | 3/2009 | Canterbury | |
| 2009/0181720 | A1 | 7/2009 | Marsico | |
| 2009/0197660 | A1 | 8/2009 | Cramer | |
| 2009/0247293 | A1 | 10/2009 | Lenger | |
| 2010/0093428 | A1 | 4/2010 | Mattice | |
| 2010/0203961 | A1 | 8/2010 | Burke | |
| 2010/0234094 | A1 | 9/2010 | Gagner | |
| 2010/0248812 | A1 | 9/2010 | Pacey | |
| 2010/0255902 | A1 | 10/2010 | Goldstein | |
| 2010/0291994 | A1 | 11/2010 | Denham | |
| 2011/0089730 | A1* | 4/2011 | Higgs | A47C 3/04 297/451.7 |
| 2011/0102546 | A1 | 5/2011 | Dhuse | |
| 2011/0109134 | A1* | 5/2011 | Filipour | A47C 7/723 463/47 |
| 2011/0111838 | A1 | 5/2011 | Bauer | |
| 2011/0117984 | A1 | 5/2011 | Shimabukuro | |
| 2011/0124405 | A1 | 5/2011 | Okada | |
| 2011/0195789 | A1 | 8/2011 | Wells | |
| 2012/0021824 | A1 | 1/2012 | Wells | |
| 2012/0028703 | A1 | 2/2012 | Anderson | |
| 2012/0035751 | A1 | 2/2012 | Dimitriadis | |
| 2012/0100908 | A1 | 4/2012 | Wells | |
| 2012/0129596 | A1 | 5/2012 | Thackston | |
| 2012/0193956 | A1* | 8/2012 | Baker | B60N 2/4221 297/217.5 |
| 2012/0229508 | A1 | 9/2012 | Wigdor | |
| 2012/0322564 | A1* | 12/2012 | Granger | G07F 17/3216 463/46 |
| 2013/0072304 | A1 | 3/2013 | Brosnan | |
| 2013/0084959 | A1 | 4/2013 | Nelson | |
| 2013/0084960 | A1 | 4/2013 | Frady | |

(56) References Cited

U.S. PATENT DOCUMENTS

| | | | |
|---|---|---|---|
| 2013/0084973 A1 | 4/2013 | Frady | |
| 2013/0085001 A1 | 4/2013 | Anderson | |
| 2013/0137498 A1 | 5/2013 | Willyard | |
| 2013/0190095 A1 | 7/2013 | Gadher | |
| 2013/0196755 A1 | 8/2013 | Nelson | |
| 2014/0219492 A1* | 8/2014 | Pelliccio | B60N 2/64 381/389 |
| 2014/0235324 A1 | 8/2014 | Ryan | |
| 2014/0256450 A1 | 9/2014 | Bleich | |
| 2014/0274309 A1 | 9/2014 | Nguyen | |
| 2014/0309012 A1 | 10/2014 | Anderson | |
| 2014/0323194 A1 | 10/2014 | Keilwert | |
| 2014/0324749 A1 | 10/2014 | Peters | |
| 2015/0279155 A1 | 10/2015 | Chun | |
| 2015/0302690 A1 | 10/2015 | Hutchinson-Kay | |
| 2016/0012465 A1 | 1/2016 | Sharp | |
| 2016/0023116 A1 | 1/2016 | Wire | |
| 2016/0292558 A1 | 10/2016 | Daniel | |
| 2016/0335840 A1 | 11/2016 | Acres | |
| 2017/0061731 A1 | 3/2017 | Colvin | |
| 2017/0161991 A1 | 6/2017 | Ayati | |
| 2017/0278304 A1 | 9/2017 | Hildreth | |
| 2017/0287593 A1 | 10/2017 | Ovalle | |
| 2017/0293669 A1 | 10/2017 | Madhavan | |
| 2017/0300876 A1 | 10/2017 | Musiala, Jr. | |
| 2017/0316644 A1 | 11/2017 | Arnone | |
| 2018/0019867 A1 | 1/2018 | Davis | |
| 2018/0096175 A1 | 4/2018 | Schmeling | |
| 2018/0096752 A1 | 4/2018 | Ovalle | |
| 2018/0114403 A1 | 4/2018 | Jayachandran | |
| 2018/0370476 A1* | 12/2018 | Alequin | B60R 21/01554 |
| 2019/0028264 A1 | 1/2019 | Bisti | |
| 2019/0028265 A1 | 1/2019 | Bisti | |
| 2019/0066488 A1 | 2/2019 | Locke | |
| 2019/0080554 A1* | 3/2019 | Barbour | G07F 17/3209 |
| 2019/0096170 A1 | 3/2019 | Lewis | |
| 2019/0096191 A1 | 3/2019 | Stuehling | |
| 2019/0102986 A1 | 4/2019 | Nelson | |
| 2019/0109714 A1 | 4/2019 | Clark | |
| 2019/0122300 A1 | 4/2019 | O'Brien | |
| 2019/0122492 A1 | 4/2019 | Nguyen | |
| 2019/0122495 A1 | 4/2019 | Yi | |
| 2019/0130698 A1 | 5/2019 | Simons | |
| 2019/0130701 A1 | 5/2019 | Simons | |
| 2019/0143207 A1 | 5/2019 | Kumar | |
| 2019/0149418 A1 | 5/2019 | Bertsche | |
| 2019/0163672 A1 | 5/2019 | Shmueli | |
| 2019/0180558 A1 | 6/2019 | Merati | |
| 2019/0188653 A1 | 6/2019 | Khaund | |
| 2019/0205894 A1 | 7/2019 | Gonzales, Jr. | |
| 2019/0221076 A1 | 7/2019 | Simons | |
| 2019/0280875 A1 | 9/2019 | Ragnoni | |
| 2019/0289019 A1 | 9/2019 | Thekadath | |
| 2019/0295371 A1 | 9/2019 | Simons | |
| 2019/0296915 A1 | 9/2019 | Lancashire | |
| 2019/0314726 A1 | 10/2019 | Masini | |
| 2019/0321722 A1 | 10/2019 | Hennessy | |
| 2019/0325700 A1 | 10/2019 | Jayachandran | |
| 2019/0333285 A1 | 10/2019 | Delia | |
| 2019/0352125 A1 | 11/2019 | Wooten | |
| 2019/0355209 A1 | 11/2019 | Sorey | |
| 2019/0373015 A1 | 12/2019 | Kozloski | |
| 2020/0020194 A1 | 1/2020 | Higgins | |
| 2020/0021600 A1 | 1/2020 | Simons | |
| 2020/0027315 A1 | 1/2020 | Cotton | |
| 2020/0051081 A1 | 2/2020 | Valecha | |
| 2020/0051368 A1 | 2/2020 | Pustizzi | |
| 2020/0066093 A1 | 2/2020 | Schwartz | |
| 2020/0090463 A1 | 3/2020 | Mohrhardt | |
| 2020/0097862 A1 | 3/2020 | Arora | |
| 2020/0105096 A1 | 4/2020 | Ovalle | |
| 2020/0110855 A1 | 4/2020 | Cunningham | |
| 2020/0145217 A1 | 5/2020 | Clark | |
| 2020/0152005 A1 | 5/2020 | Higgins | |
| 2020/0168036 A1 | 5/2020 | Schwartz | |
| 2020/0168038 A1 | 5/2020 | Schwartz | |
| 2020/0189420 A1* | 6/2020 | Urano | B60N 2/0029 |
| 2020/0193764 A1 | 6/2020 | Ovalle | |
| 2020/0202668 A1 | 6/2020 | Cotta | |
| 2020/0211325 A1 | 7/2020 | Kaizerman | |
| 2020/0380817 A1 | 12/2020 | Purohit | |
| 2020/0410433 A1 | 12/2020 | Rahilly | |
| 2020/0412813 A1 | 12/2020 | Mong | |
| 2021/0037013 A1 | 2/2021 | Salkintzis | |
| 2021/0174634 A1 | 6/2021 | Purohit | |
| 2021/0233351 A1 | 7/2021 | Meltzer | |
| 2021/0241566 A1 | 8/2021 | Russ | |
| 2021/0255995 A1 | 8/2021 | Shmueli | |
| 2021/0327208 A1 | 10/2021 | Colvin | |
| 2021/0335085 A1 | 10/2021 | Froy, Jr. | |
| 2021/0350659 A1 | 11/2021 | Purohit | |
| 2022/0006831 A1 | 1/2022 | Garg | |
| 2022/0030000 A1 | 1/2022 | Lee | |
| 2022/0038280 A1 | 2/2022 | Punal | |
| 2022/0207959 A1 | 6/2022 | Schwartz | |
| 2022/0215719 A1 | 7/2022 | Schwartz | |
| 2022/0383695 A1 | 12/2022 | Demarco | |
| 2022/0392312 A1 | 12/2022 | Marks | |
| 2023/0130583 A1 | 4/2023 | Shaffer, Jr. | |
| 2023/0306816 A1 | 9/2023 | Nimish | |
| 2023/0419778 A1 | 12/2023 | Schwartz | |

FOREIGN PATENT DOCUMENTS

| | | |
|---|---|---|
| WO | 2019089774 A1 | 5/2019 |
| WO | 2019089778 A1 | 5/2019 |

OTHER PUBLICATIONS

Office Action (Notice of Allowance and Fees Due (PTOL-85)) dated Jan. 5, 2023 for U.S. Appl. No. 17/222,763 (pp. 1-7).

Office Action (Non-Final Rejection) dated Jan. 18, 2023 for U.S. Appl. No. 17/671,388 (pp. 1-6).

Office Action (Notice of Allowance and Fees Due (PTOL-85)) dated Feb. 10, 2023 for U.S. Appl. No. 17/721,152 (pp. 1-10).

Office Action (Non-Final Rejection) dated Mar. 16, 2023 for U.S. Appl. No. 17/529,050 (pp. 1-13).

Office Action (Non-Final Rejection) dated Mar. 16, 2023 for U.S. Appl. No. 17/529,069 (pp. 1-13).

Office Action (Non-Final Rejection) dated Apr. 12, 2023 for U.S. Appl. No. 17/543,339 (pp. 1-5).

Office Action (Notice of Allowance and Fees Due (PTOL-85)) dated Apr. 14, 2023 for U.S. Appl. No. 17/529,069 (pp. 1-9).

Notice of Allowance dated Apr. 14, 2023 for U.S. Appl. No. 17/529,050 (pp. 1-9).

Office Action (Notice of Allowance and Fees Due (PTOL-85)) dated Apr. 26, 2023 for U.S. Appl. No. 17/671,388 (pp. 1-9).

Office Action (Notice of Allowance and Fees Due (PTOL-85)) dated May 10, 2023 for U.S. Appl. No. 17/543,339 (pp. 1-5).

Office Action (Notice of Allowance and Fees Due (PTOL-85)) dated Jun. 7, 2023 for U.S. Appl. No. 17/697,637 (pp. 1-9).

Australian Examination Report No. 1 issued in App. No. AU2019219795, dated Oct. 16, 2023, 4 pages.

Office Action (Non-Final Rejection) dated Dec. 6, 2023 for U.S. Appl. No. 17/844,466 (pp. 1-7).

Office Action (Notice of Allowance and Fees Due (PTOL-85)) dated Feb. 22, 2024 for U.S. Appl. No. 17/705,010 (pp. 1-9).

Office Action (Non-Final Rejection) dated Mar. 7, 2024 for U.S. Appl. No. 18/351,965 (pp. 1-38).

Office Action (Non-Final Rejection) dated Mar. 7, 2024 for U.S. Appl. No. 18/351,962 (pp. 1-38).

Office Action dated Mar. 19, 2024 for U.S. Appl. No. 18/191,693 (pp. 1-17).

Notice of Allowance dated Mar. 22, 2024 for U.S. Appl. No. 17/858,769 (pp. 1-9).

Notice of Allowance dated Apr. 16, 2024 for U.S. Appl. No. 17/844,466 (pp. 1-5).

Office Action (Notice of Allowance and Fees Due (PTOL-85)) dated Apr. 16, 2024 for U.S. Appl. No. 17/844,466 (pp. 1-5).

(56) References Cited

OTHER PUBLICATIONS

Brendan Koemer, "Russians Engineer A Brilliant Slot Machine Cheat—And Casinos Have No Fix", https://www.wired.com/2017/02/russians-engineer-brilliant-slot-machine-cheat-casinos-no-fix/, Nov. 6, 2018, 14 pages.
Brendan Koemer, "Meet Alex, The Russian Casino Hacker Who Makes Millions Targeting Slot Machines", https://Wired.com/story/meet-alex-the-russian-casino-hacker-who-makes-millions-targeting-slot-machines/, Nov. 6, 2018, 18 pages.
Office Action dated Mar. 8, 2021 for U.S. Appl. No. 16/415,654 (pp. 1-12).
Office Action (Notice of Allowance and Fees Due (PTOL-85)) dated Nov. 26, 2021 for U.S. Appl. No. 16/778,743 (pp. 1-9).
Office Action (Notice of Allowance and Fees Due (PTOL-85)) dated Aug. 25, 2021 for U.S. Appl. No. 16/415,654 (pp. 1-10).
Office Action (Notice of Allowance and Fees Due (PTOL-85)) dated Oct. 6, 2021 for U.S. Appl. No. 16/864,800 (pp. 1-9).
Office Action (Notice of Allowance and Fees Due (PTOL-85)) dated Dec. 8, 2021 for U.S. Appl. No. 16/778,768 (pp. 1-8).
Office Action (Notice of Allowance and Fees Due (PTOL-85)) dated Dec. 21, 2021 for U.S. Appl. No. 16/837,655 (pp. 1-8).
Office Action (Notice of Allowance and Fees Due (PTOL-85)) dated Dec. 23, 2021 for U.S. Appl. No. 16/778,841 (pp. 1-9).
Office Action (Notice of Allowance and Fees Due (PTOL-85)) dated Feb. 8, 2022 for U.S. Appl. No. 16/778,987 (pp. 1-8).
Office Action (Notice of Allowance and Fees Due (PTOL-85)) dated Jan. 13, 2022 for U.S. Appl. No. 16/864,800 (pp. 1-7).
Office Action (Notice of Allowance and Fees Due (PTOL-85)) dated Jan. 14, 2022 for U.S. Appl. No. 16/778,923 (pp. 1-8).
Office Action (Notice of Allowance and Fees Due (PTOL-85)) dated Aug. 11, 2021 for U.S. Appl. No. 16/902,186 (pp. 1-8).
Office Action (Notice of Allowance and Fees Due (PTOL-85)) dated Feb. 2, 2022 for U.S. Appl. No. 16/778,889 (pp. 1-8).
Office Action (Non-Final Rejection) dated Feb. 1, 2022 for U.S. Appl. No. 17/222,763 (pp. 1-9).
Office Action (Notice of Allowance and Fees Due (PTOL-85) dated Mar. 9, 2022 for U.S. Appl. No. 16/841,957 (pp. 1-9).
Office Action (Final Rejection) dated May 13, 2022 for U.S. Appl. No. 17/222,763 (pp. 1-11).
Australian Examination Report No. 1 issued in App. No. AU2023201845, daated Jun. 12, 2024, 4 pages.
Office Action (Non-Final Rejection) dated Jun. 18, 2024 for U.S. Appl. No. 17/857,988 (pp. 1-18).
Office Action (Notice of Allowance and Fees Due (PTOL-85)) dated Jul. 9, 2024 for U.S. Appl. No. 17/858,769 (pp. 1-8).
Office Action (Notice of Allowance and Fees Due (PTOL-85)) dated Jul. 16, 2024 for U.S. Appl. No. 18/351,965 (pp. 1-8).
Office Action (Notice of Allowance and Fees Due (PTOL-85)) dated Jul. 16, 2024 for U.S. Appl. No. 18/351,962 (pp. 1-8).
Office Action (Notice of Allowance and Fees Due (PTOL-85)) dated Aug. 14, 2024 for U.S. Appl. No. 17/858,769 (pp. 1-2).
Office Action (Non-Final Rejection) dated Aug. 19, 2024 for U.S. Appl. No. 18/364,231 (pp. 1-6).
Office Action (Non-Final Rejection) dated Aug. 20, 2024 for U.S. Appl. No. 17/858,009 (pp. 1-9).
Office Action (Non-Final Rejection) dated Sep. 6, 2024 for U.S. Appl. No. 18/302,542 (pp. 1-5).
Office Action (Final Rejection) dated Sep. 23, 2024 for U.S. Appl. No. 18/191,693 (pp. 1-10).
Office Action (Non-Final Rejection) dated Sep. 25, 2024 for U.S. Appl. No. 18/461,233 (pp. 1-11).

* cited by examiner

SLIDABLE GAMING CHAIR INCLUDING RETURN-TO-HOME FEATURE

CROSS REFERENCE TO RELATED APPLICATIONS

This application claims the benefit of priority to U.S. Provisional Patent Application No. 63/188,911, filed May 14, 2021, the contents and disclosure of which are incorporated by reference herein in their entireties.

TECHNICAL FIELD

The field of disclosure relates generally to electronic gaming, and more specifically, to a slidable gaming chair including a return-to-home feature.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming system is described. The electronic gaming system includes an upper assembly including a chair and at least one sensor. The electronic gaming system also includes a lower assembly coupled to the upper assembly by a support structure wherein the lower assembly includes a centering system and wherein the centering system is configured to return the chair to a predefined home position in response to the at least one sensor of the upper assembly detecting a weight below a predefined threshold.

In another aspect, a chair is described. The chair includes an upper assembly including a seat and at least one sensor. The chair also includes a lower assembly coupled to the upper assembly by a support structure, wherein the lower assembly includes a centering system, and wherein the centering system is configured to return the seat to a predefined home position in response to the at least one sensor of the upper assembly sensing that the chair is unoccupied.

In yet another aspect, a method of returning a chair to a predefined home position is described. The method includes determining, by a processor, based upon a signal transmitted from at least one sensor of an upper assembly of the chair, that a weight in the chair is below a predefined threshold. The method also includes, in response to determining that the weight in the chair is below the predefined threshold, controlling, by the processor, a lower assembly coupled to the upper assembly to return the chair to the predefined home position.

DETAILED DESCRIPTION

Figure 1:
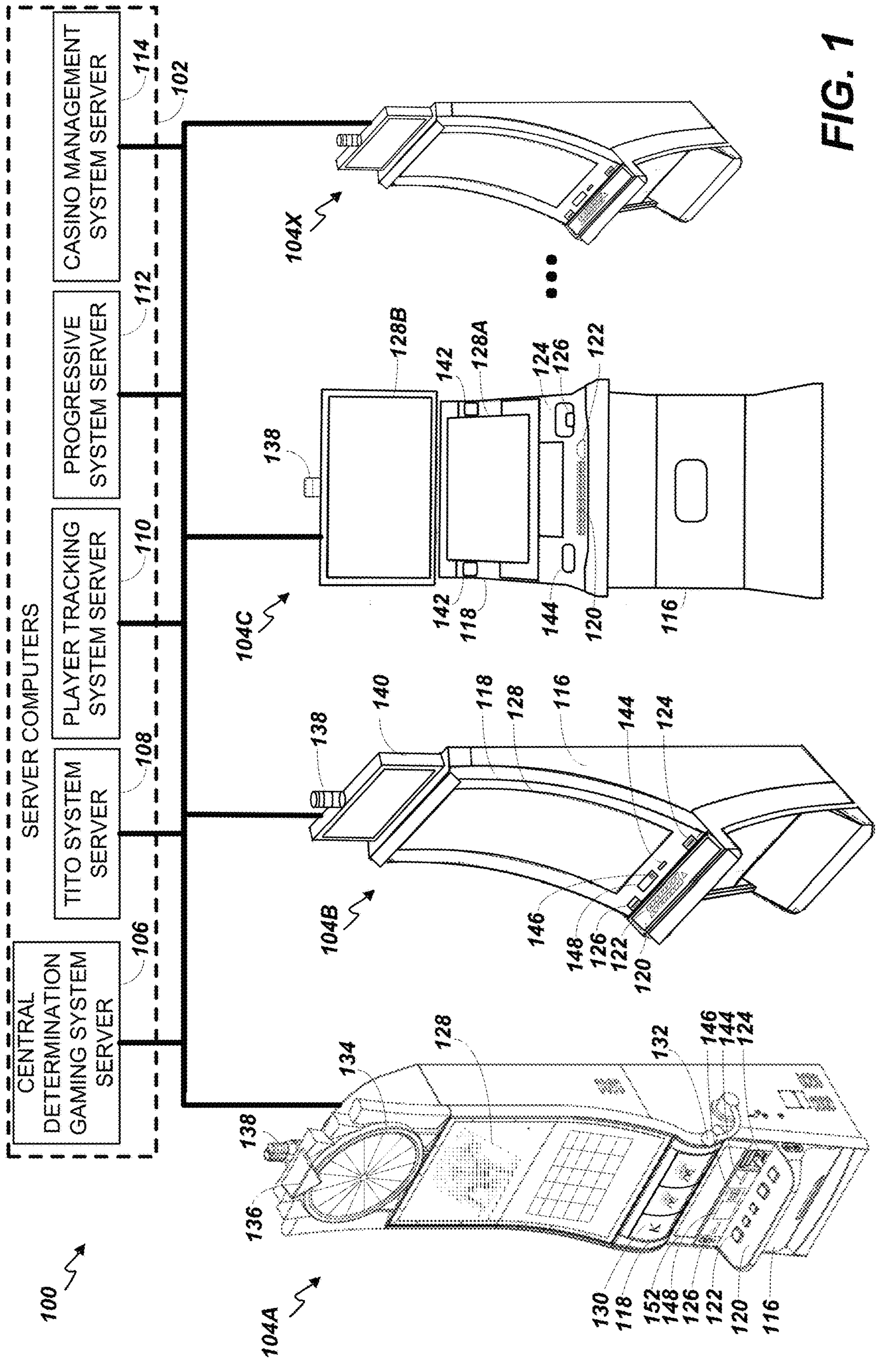
FIG. 1 is an exemplary diagram showing several EGMs networked with various gaming related servers.

Embodiments of the present disclosure provide for a gaming chair ("chair") (e.g., chair, stool, seat, etc.) that can be movably positioned with respect to a device such as an electronic gaming machine (EGM), as described herein. The chair allows a user to position themselves with respect to the other device to interact with the other device. In the example embodiment, the chair may be slidable and/or otherwise positionable along its base to adjust to be closer to or further from the other device. In some embodiments, the base can couple to, be inserted into, snap against, and/or otherwise be positioned in and/or abut the other device. In some embodiments, wires and/or other connections can extend from the other device to the chair and be covered and/or otherwise camouflaged by the base of the chair. The wires and/or other connections enable the chair and/or input devices coupled to the chair to electronically communicate with the other device, and in some cases, allows for game play input from a player sitting on the chair to the game being played on the EGM.

In the example embodiment, the gaming chair includes a return to home feature (e.g., chair returns to a starting position when a patron sitting in the chair exits the chair) such that, when a patron is not sitting in the gaming chair, the gaming chair automatically returns to a predetermined home position along the base. In some embodiments, the home position may be defined as a center position on the base of the chair. For example, a motor coupled to the chair for returning the chair to the home position may be automatically turned off or placed in an idle position when a patron is sitting in the chair and/or has manually slid the chair forward/backward along the base (e.g., the base of the chair may provide approximately 10 lbs. of drag force to keep the chair in place once the patron has stopped adjusting the position of the chair). At least one sensor may be included in the chair and in communication with the motor to detect when a patron is seated in the chair, thus placing the motor in the off or idle position. Further, at least one other sensor (e.g., position sensor) may be included in the base of the chair to detect a position of the chair along the base relative to the home position.

In response to at least one sensor detecting that a patron is no longer seated in the chair, the chair is controlled to be returned to the predefined home position. For example, the motor may be coupled to a linear actuator that may be configured to automatically be turned on to move the chair using the linear actuator along the slidable base until the at least one position sensor detects that the chair has returned to the predefined home position (e.g., the center of the base, or any predefined position along the base).

Accordingly, the chair disclosed herein provides many benefits over known gaming chairs. Known gaming chairs (e.g., a four-legged chair) are moved about freely by patrons playing and leaving gaming machines. Personnel are required to move the known gaming chairs back in toward a gaming machine once a patron leaves (e.g., having chairs pushed away from gaming machines causes a safety hazard and other inconveniences). Accordingly, the gaming chair disclosed herein is configured to automatically return to a home position on its base upon determining that no patron is seated in the chair, eliminating the need for personnel to monitor, as an example, a casino floor to constantly be pushing chairs back into position with respect to a gaming machine. In addition, by automatically returning to the home position, it makes it easier for patrons who want to play the EGM to more easily access the game since the chair is always in a position that is easy for any size player to access the chair. Players may then reposition the chair either closer to or further away from the EGM depending upon the size of the player. Further, the example chair described herein more-closely resembles a sports car style chair (e.g., providing more comfort and features) than a typical four-legged chair found in casinos.

In some embodiments, the chair may automatically adjust the chair position (e.g., forward/backward) according to a player's pre-defined preferences (e.g., stored in/associated with a player account—similar to predefined seating/mirror position settings in a car). For example, the seat may automatically be adjusted to the player's liking when the player inserts their player tracking card into an EGM to begin gameplay. Further, the seat may wirelessly communicate with a mobile device associated with a player (e.g., via NFC, Bluetooth, WiFi, UWB, etc.) to adjust to the player's preferred favorite seat position. When the player leaves the seat, the seat recognizes (e.g., via one or more sensors) that the player has left and automatically returns to the home position (e.g., after a predefined period of time).

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
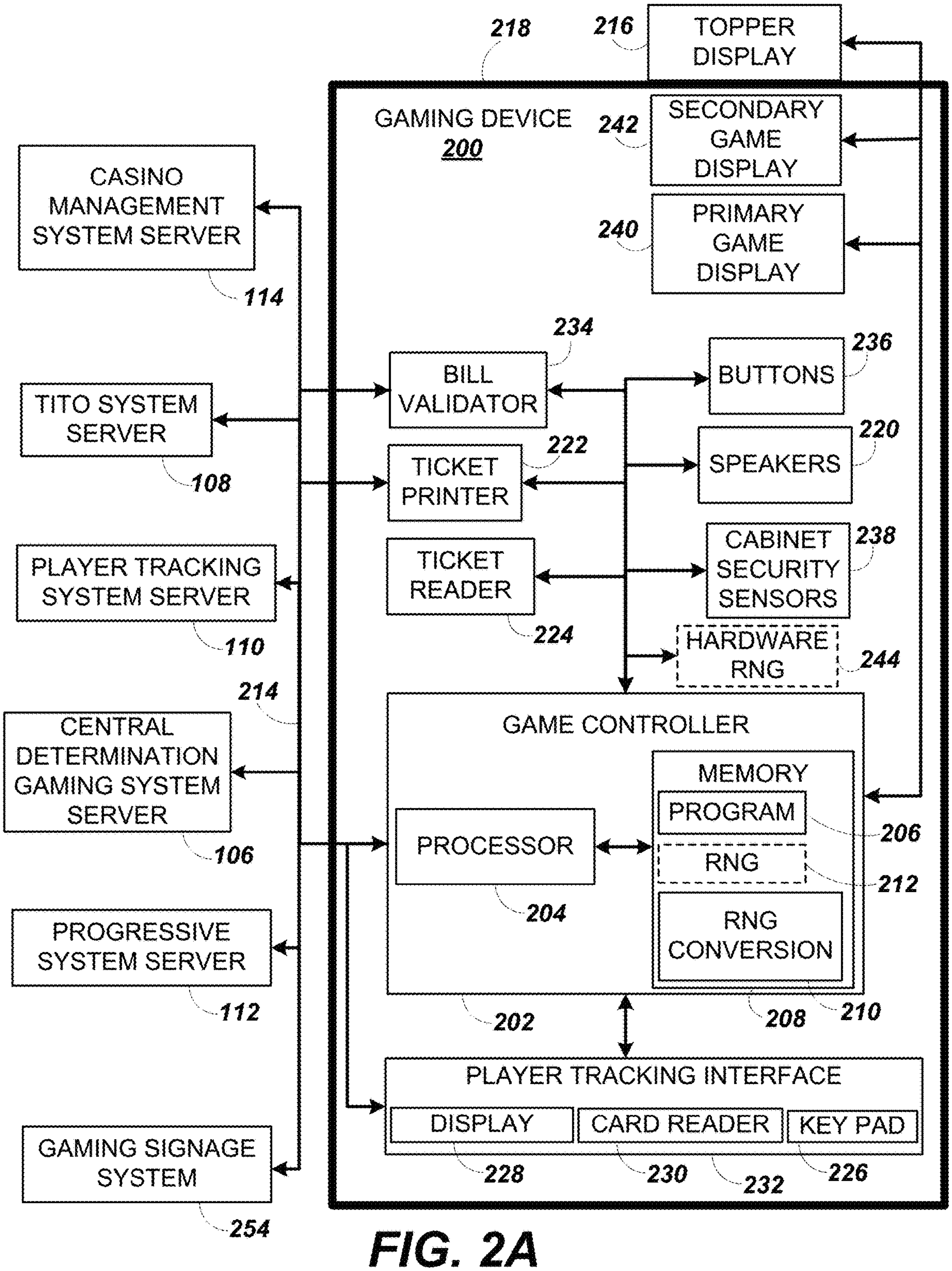
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts). Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
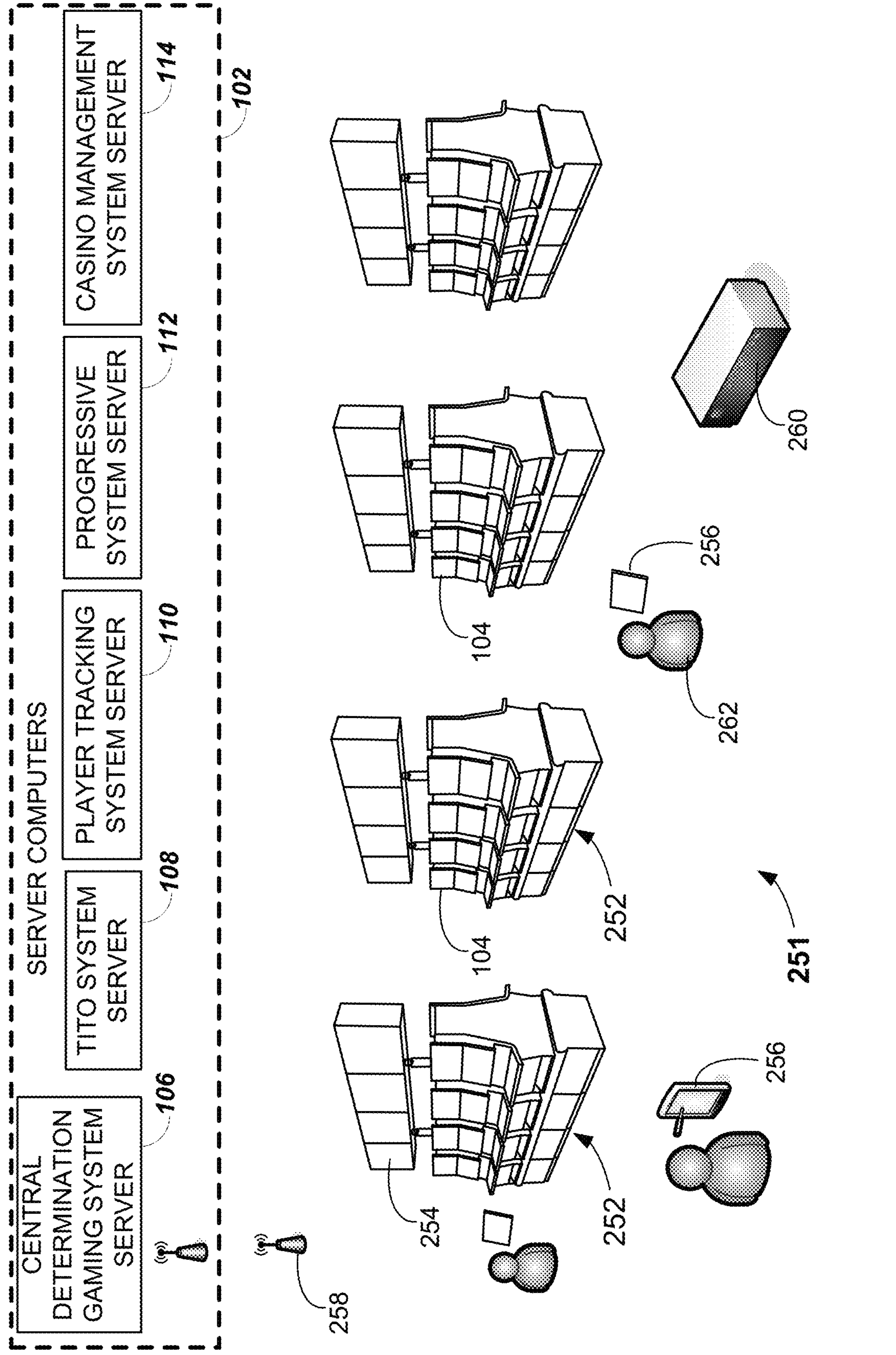
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
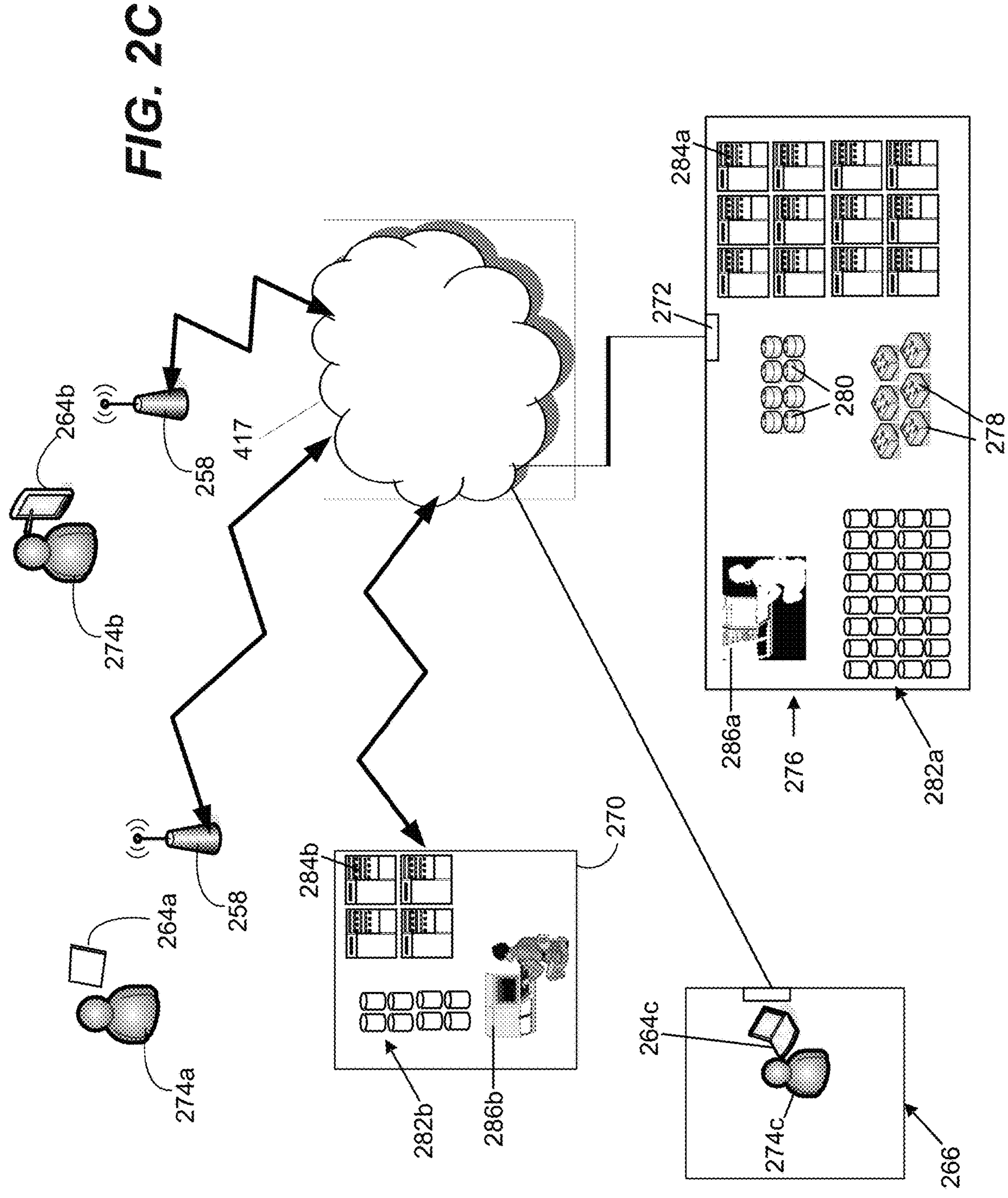
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
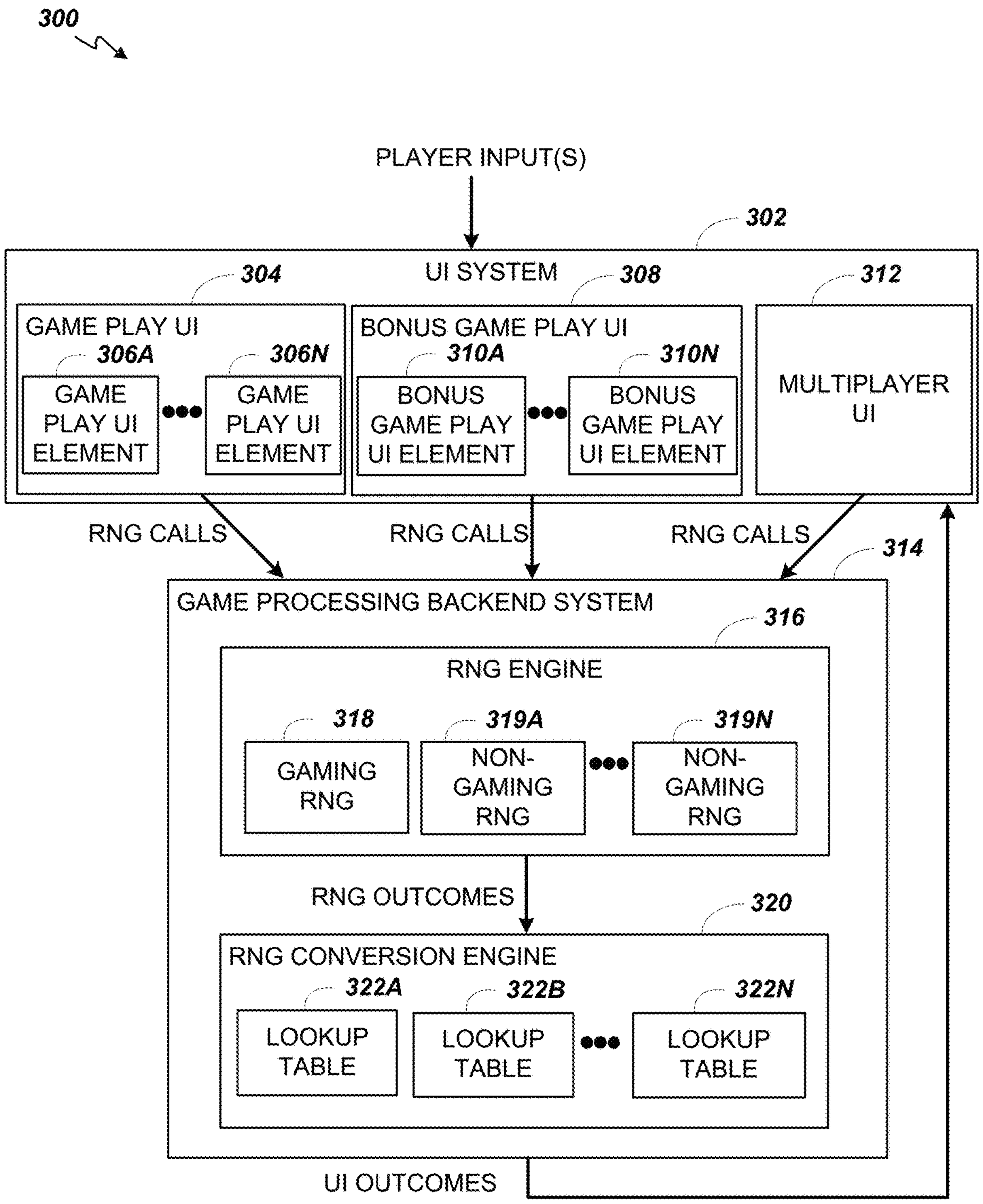
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
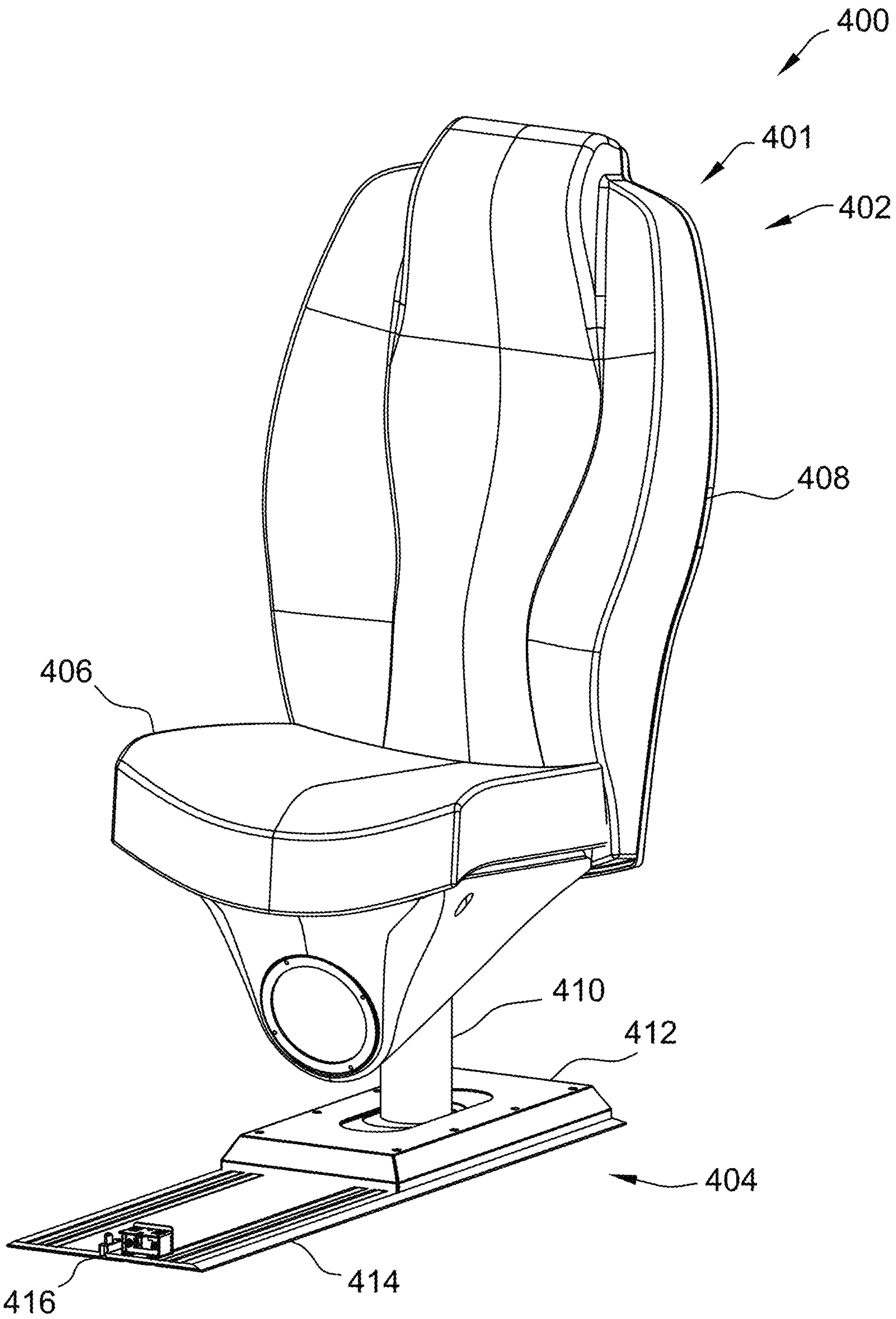
FIG. 4 illustrates a perspective view of an exemplary slidable gaming chair.

FIG. 4 illustrates a perspective view of an exemplary slidable gaming chair system 400. In the example embodiment, system 400 includes a chair 401 that can be movably positioned with respect to a device such as an EGM (e.g., EGMs 104A-104X). System 400 includes an upper assembly 402 including chair 401 and a lower assembly 404. In the example embodiment, upper assembly 402 includes a chair seat 406 and a chair back 408 wherein an upper end of a supporting structure 410 is coupled to seat 406 (e.g., structure 410 and seat 406 may be coupled to an understructure (not shown) beneath seat 406). Supporting structure 410 is coupled to a movable plate 412 (e.g., movable plate 412 is contained within a fixed cover over/coupled to sliding components of lower assembly 404) of lower assembly 404. Lower assembly 404 also includes a floorplate 414, wherein movable plate 412 (e.g., a carriage) is slidably coupled to floorplate 414 (e.g., along a groove, slot, track, or the like).

In the example embodiment, chair 401 allows a patron to position themselves with respect to an EGM (e.g., EGMs 104A-104X, or any other electronic gaming device) and automatically returns to a home position when the patron is no longer seated in chair 401. In some embodiments, the home position may be defined as a center position on floorplate 414. In some embodiments, the home position may be defined as any position along floorplate 414 which is chosen (e.g., by an operator/manufacturer) to be the home position.

For example, a linear actuator system (e.g., controlled by any controller and/or electronics as described herein) including a motor may be coupled to lower assembly 404. The motor of the linear actuator system (e.g., centering system) may be automatically turned off when a patron is sitting in the chair (e.g., as determined by at least one sensor) and/or has slid the chair forward/backward along the base (e.g., 10 lbs. of frictional drag force may be applied to keep the chair in place once the patron has stopped adjusting the position of chair 401). At least one sensor may be included in seat 406 and/or back 408 to detect when a patron is seated in chair 401. For example, a sensor and/or processor coupled to the sensor may detect when chair 401 is occupied or unoccupied (e.g., based upon a predetermined weight threshold, such as 25 pounds). In other words, it may be determined, based upon sensor readings, that the chair is occupied or unoccupied based upon the sensor readings/signals indicating that a weight in chair 401 is above or below a predefined threshold weight.

Further, at least one sensor may be included in lower assembly 404 to detect a position of chair 401 along floorplate 414. In the example embodiment, the at least one sensor is utilized to determine when chair 401 has returned to a home position. Further, the at least one sensor may be utilized to determine a position of chair 401 along floorplate 414 at any time (e.g., indicating a length away from the front edge of floorplate 414).

The linear actuator system described herein is configured to generate force to move chair 401 in both forward and backward directions. In some embodiments, any linear actuator may be used in the linear actuator system. In some embodiments, a system different from a linear actuator system may be utilized to implement the return to center functionality described herein. In the example embodiment, a linear actuator including a screw and an engagement mechanism (e.g., a screw shaft) is envisioned. For example, in the linear actuator system, a screw may be coupled to a motor, and an engagement mechanism may be coupled to the screw and/or actuator and at least a portion of chair 401 (e.g., a moveable plate coupled to a support structure of chair 401). The motor is configured to turn and/or push/pull the screw in at least two directions: a first direction causing the engagement mechanism to move chair 401 in a first direction (e.g., away from an EGM) and a second direction causing the engagement mechanism to move chair 401 in a second direction (e.g., closer to an EGM). In some embodiments, the engagement mechanism and/or screw are configured to move freely and or nearly-freely (e.g., providing enough force to hold chair 401 at the home position) once chair 401 has returned to the home position in order to allow a patron to move chair 401 forward and/or backward to their liking.

As an example, a patron may find chair 401 positioned in a defined home position (e.g., centered on floorplate 414). The patron may sit in chair 401 and move chair 401 forward/backward along floorplate 414 as they desire (e.g., freely because the linear actuator is powered off) in order to utilize a device proximate to and/or coupled to chair 401. The patron may then stand up from the chair and walk away. In the example embodiment, chair 401 is configured to wait a predetermined amount of time (e.g., 10 seconds) before automatically moving to the home position (e.g., as controlled by a PCB logic module and/or other processor, as described herein). After the predetermined amount of time elapses, the motor of the linear actuator system is turned on in order to return chair 401 to the home position (e.g., as sensed by the at least one sensor/switch in floorplate 414).

In some embodiments, chair 401 includes a removable seat cover enabling quick changing and/or maintenance of the seat cover. In some embodiments, chair 401 is configured for quick replacement/removal (e.g., only two screws may hold seat 406 in place so that only the two screws need to be removed in order to remove seat 406).

Further, lower assembly 404 may include compatibility electronics 416 such that system 400 may be easily installed and compatible with current and future EGMs (e.g., EGMs 104A-104X) and/or other devices (e.g., other gaming devices). For example, system 400 may include in-seat speakers and/or a subwoofer/base shaker configured to produce outputs according to a game being played on an EGM. Accordingly, via compatibility electronics 416, system 400 is in communication with another device (e.g., an EGM) that may control at least a portion of chair 401 and/or system 400 (e.g., controllable electronic components such as speakers, subwoofers/shakers, screens, and/or back-side screens, etc.). For example, speakers and/or subwoofers/shakers, may cause at least a portion of chair 401 to move, shake, vibrate, etc. In some embodiments, system 400 may be communicatively coupled with another device via electronics 416 or any other means (e.g., Bluetooth® or other near-field communication technology).

In some embodiments, signals (e.g., related to a game played at an EGM) may be sent from system 400 to a device communicatively coupled to system 400 (e.g., a user input may be received at system 400 and transmitted to an EGM in communication with system 400). As an example, at least one sensor in chair 401 may sense that a patron is no longer in chair 401 and transmit a signal to a connected device (e.g., an EGM) that causes the EGM to transition from a game play mode (e.g., wherein a game is being displayed) to an attract mode (e.g., wherein advertisements and/or other features are displayed at the EGM to encourage other patrons to play a game at the EGM, etc.). As another example, the EGM may transition from an attract mode to a game play mode when at least one sensor senses that a patron is seated in chair 401 (e.g., sensing that a weight in chair 401 is above a predefined threshold).

In some embodiments, system 400 may automatically adjust the position of chair 401 (e.g., forward/backward) according to a player's pre-defined preferences (e.g., stored in/associated with a player account (e.g., at server 110)—similar to predefined seating/mirror position settings in a car). For example, chair 401 may automatically be adjusted to the player's liking when the player inserts their player tracking card into an EGM to begin gameplay. Further, chair 401 may wirelessly communicate with the player's cell phone (e.g., device 256, via NFC, Bluetooth, WiFi, etc. techniques) to adjust to the player's preferred favorite seat position. When the player leaves seat 401, seat 401 recognizes (e.g., via one or more sensors) that the player has left and automatically returns to the home position (e.g., after a predefined period of time).

Figure 5:
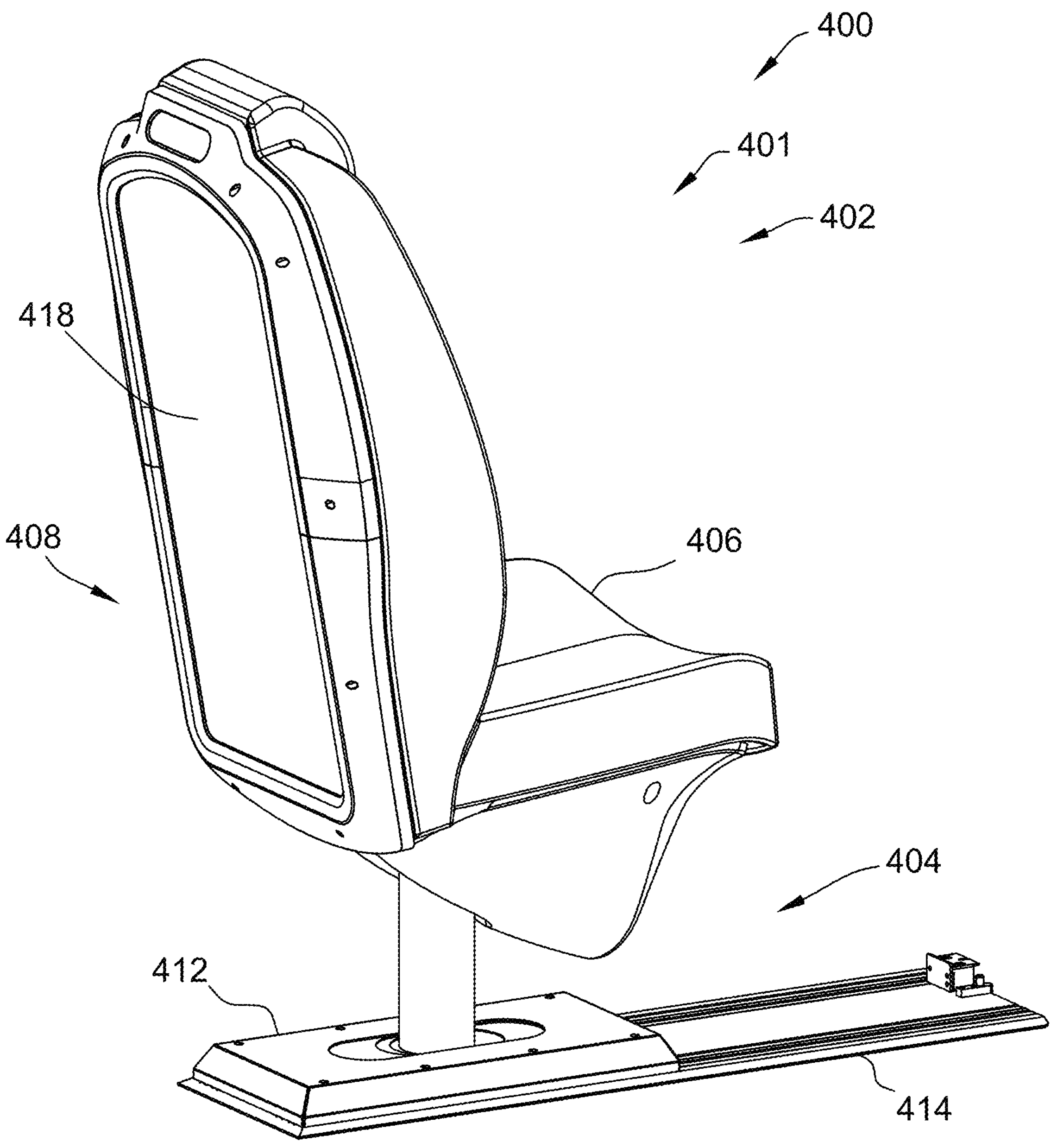
FIG. 5 illustrates a side perspective view of the exemplary slidable gaming chair shown in FIG. 4.
Figure 6:
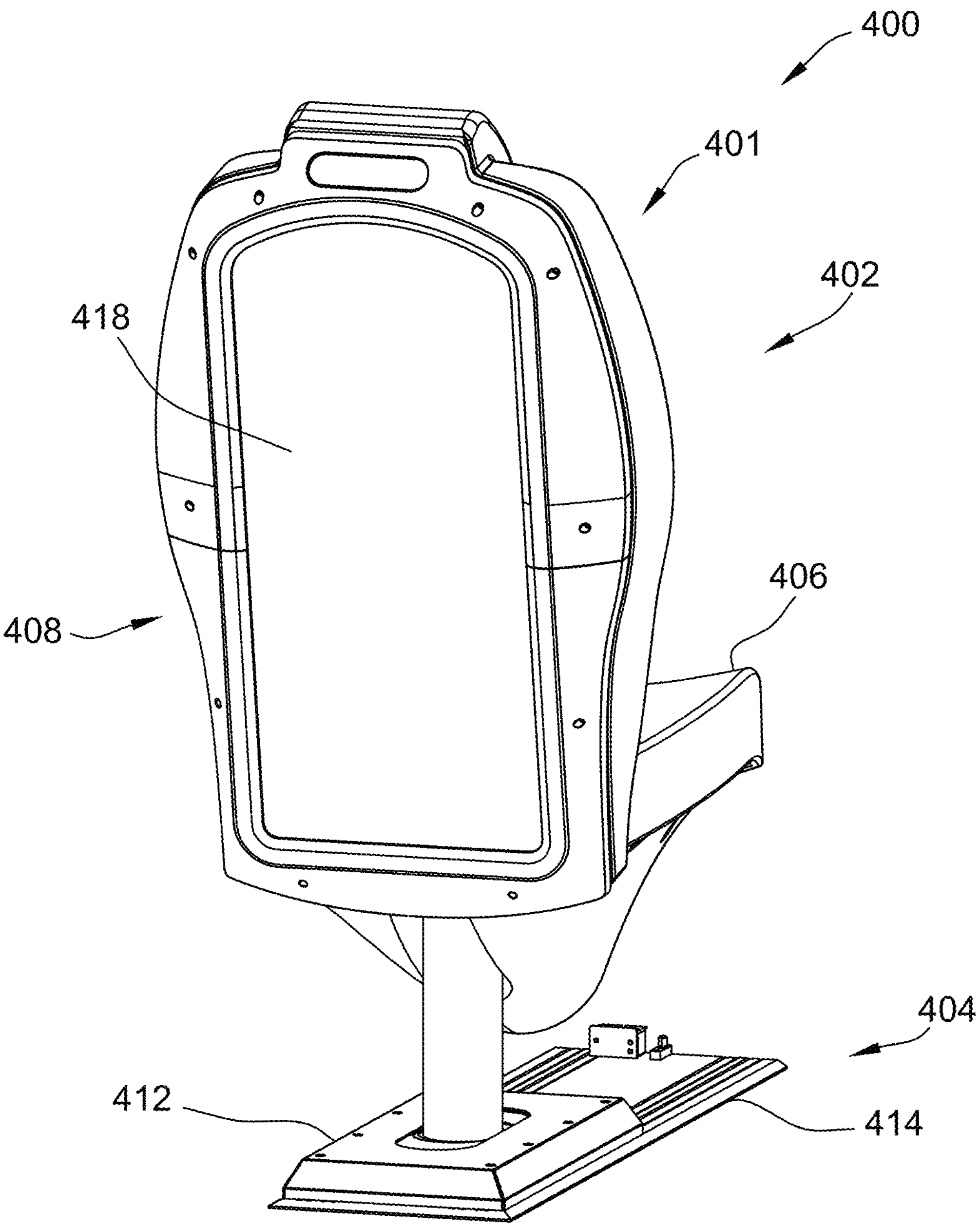
FIG. 6 illustrates a rear perspective view of the exemplary slidable gaming chair shown in FIG. 4.

FIG. 5 illustrates a side perspective view of exemplary slidable gaming chair system 400 including chair 401 shown in FIG. 4. FIG. 6 illustrates a rear perspective view of exemplary slidable gaming chair system 400 including chair 401 shown in FIG. 4. As shown in FIGS. 5 and 6, in some embodiments chair 401 includes a back-side electronic screen 418 (e.g., a high-resolution liquid crystal display (LCD), plasma, light emitting diode (LED), or organic light emitting diode (OLED) panel which may be flat or curved as shown, a cathode ray tube, or other conventional electronically controlled video monitor) that may be controlled to display pictures and/or animations/videos in accordance with a device in communication with system 400 (e.g., an EGM, a server, etc.).

Figure 7:
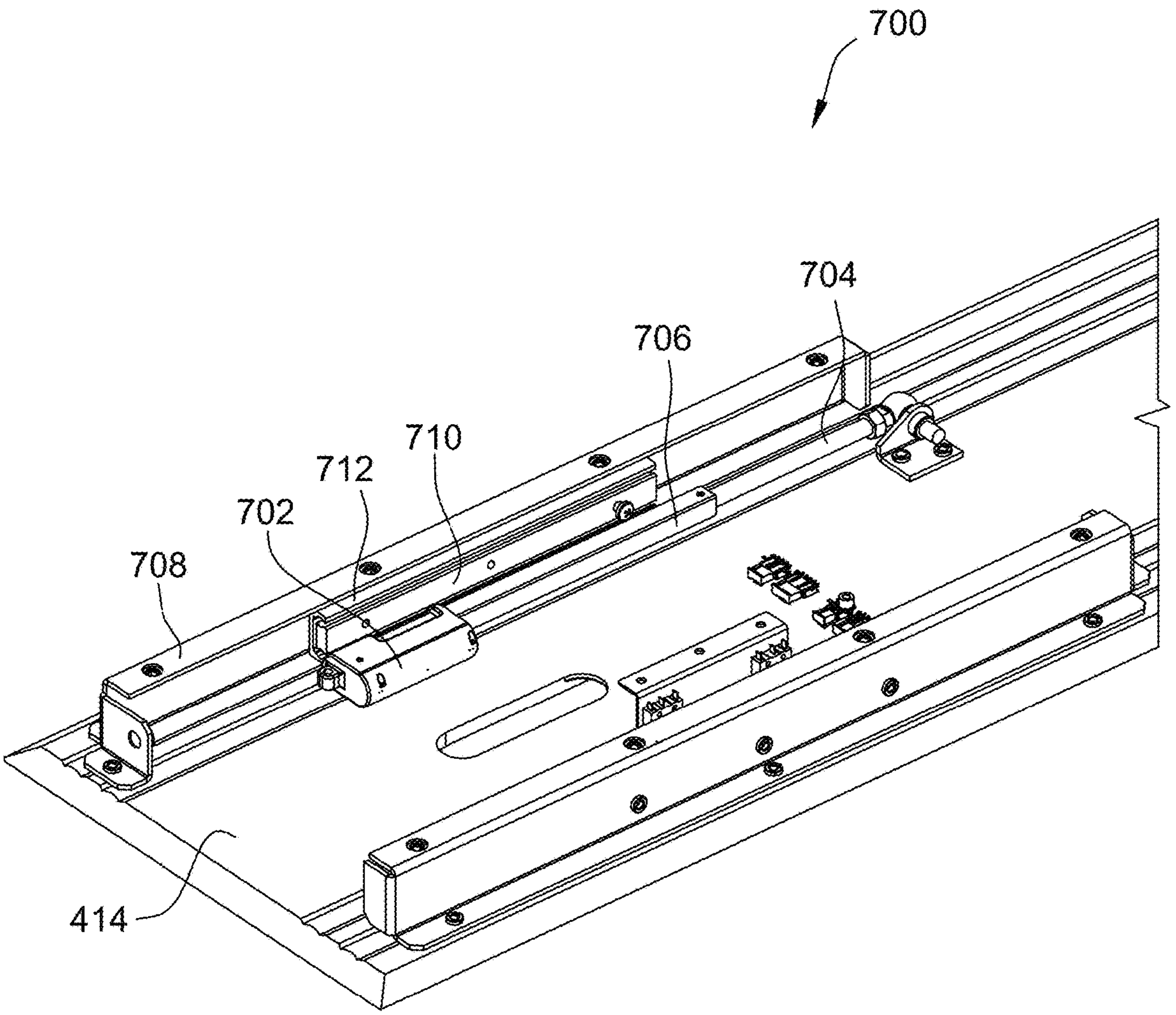
FIG. 7 illustrates an exemplary perspective view of a linear actuator system of the exemplary slidable gaming chair shown in FIG. 4
Figure 8:
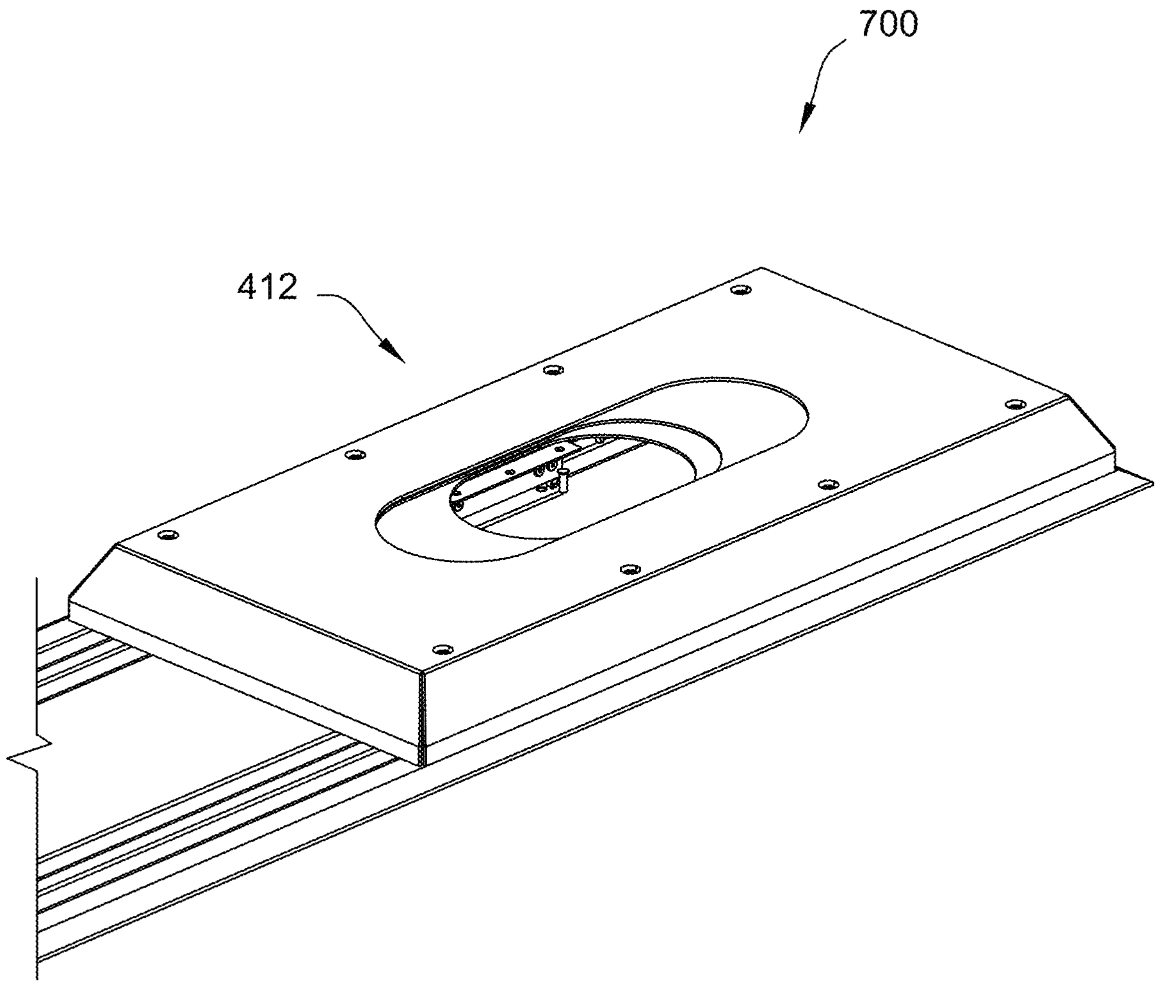
FIG. 8 illustrates another exemplary perspective view of the linear actuator system shown in FIG. 7.
Figure 9:
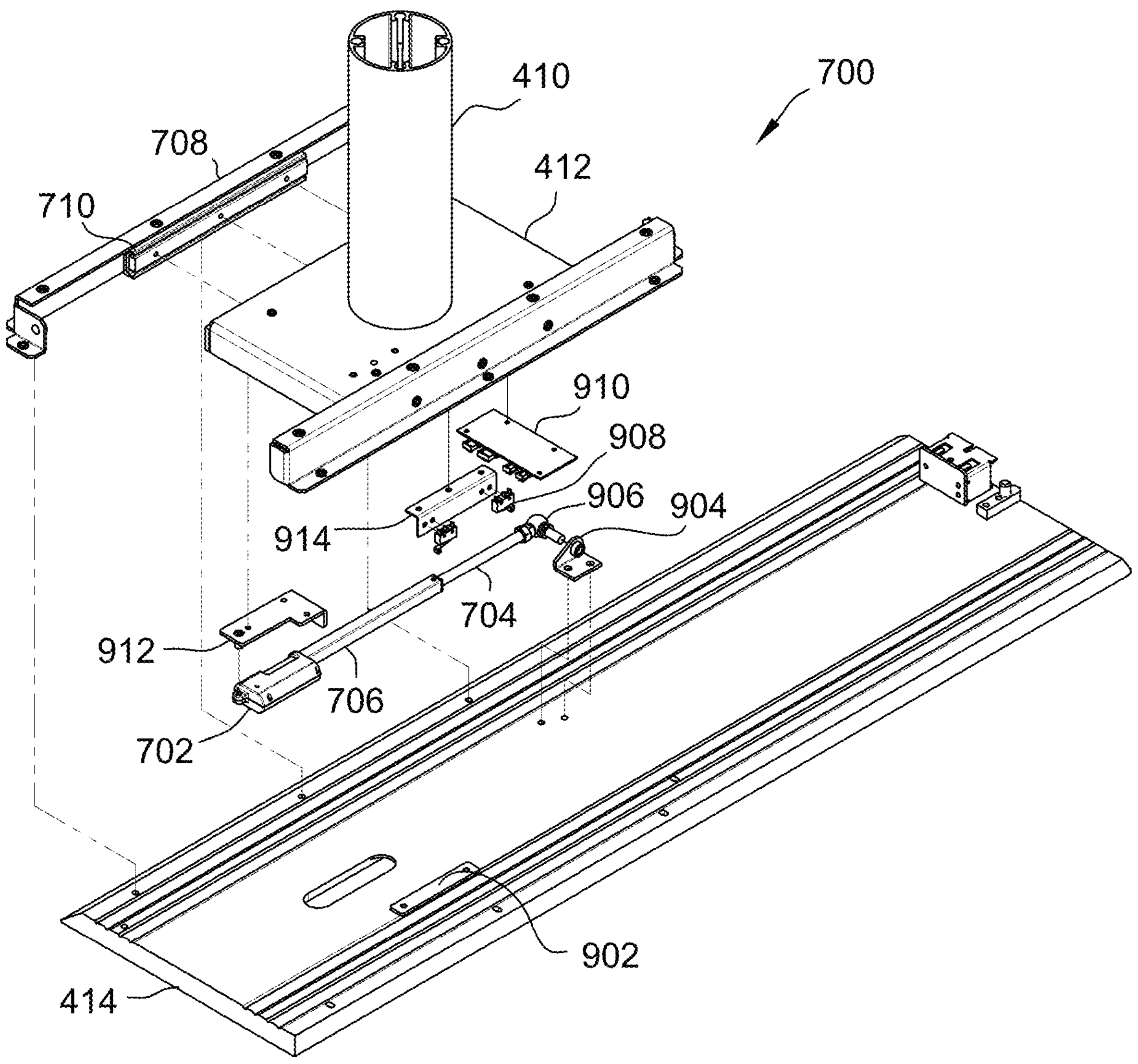
FIG. 9 illustrates an exemplary exploded view of the linear actuator system shown in FIG. 7.

FIG. 7 illustrates an exemplary perspective view of a linear actuator system 700 (e.g., a lower assembly) of exemplary slidable gaming chair system 400. FIG. 8 illustrates another exemplary perspective view of linear actuator system 700 as enclosed by plate 412. FIG. 9 illustrates an exemplary exploded view of linear actuator system 700. In the example embodiment, system 700 includes at least floorplate 414, actuator 702 (e.g., including a motor), screw 704, receiving member 706, side housing 708, slide rail 710, and slide rail housing 712.

In some embodiments, actuator system 700 may include a linear actuator include a compact side by side design with a planetary gearbox, offering higher speeds, higher forces, and longer life than other similar units while being light enough to mount almost anywhere. The linear actuator may be operated by reversing polarity on an actuator's two leads. In some embodiments, the linear actuator includes end of stroke limit switches to that will turn the unit off if it runs into its end stop. These can be run with a DPDT switch, push button switch, wireless controller, relay or, for RC, a brushed reversible DC motor controller can be used. For example, the linear actuator may be a "P16-S" linear actuator offered by Actuonix (e.g., more details describing this example linear actuator provided at the following web address: https://www.actuonix.com/P16-S-Linear-Actuator-p/p16-s.htm).

In the example embodiment, actuator 702 is configured to turn screw 704 into and out of member 706. As screw 704 moves into and out of member 706, slide rail 710 moves into and out of side rail housing 712 and/or actuator 702 slides along bearings in order to move plate 412 (and therefore chair 401) forwards and backwards. In the example embodiment, actuator 702 includes a back drive force configured to prevent back drive of screw 704 (e.g., greater than 500 newtons (500N) of back drive force).

For example, actuator 702 may turn screw 704 in a first direction, causing screw 704 to move out of member 706. Accordingly, slide rail 710 moves out of housing 712 and/or actuator 702 moves on bearings in a first direction, causing plate 412 and chair 401 to also move in a first direction. Further, actuator 702 may turn screw 704 in a second direction, causing screw 704 to move out of member 706. Accordingly, slide rail 710 moves into housing 712 and/or actuator 702 moves on bearings in a second direction, causing plate 412 and chair 401 to also move in a second direction.

Further, in some embodiments, at least actuator 702, screw 704, and rail 710 are configured to move freely and/or nearly-freely (e.g., providing enough force to hold chair 401 at the home position before a patron sits down) once chair 401 has returned to the home position in order to allow a patron to move chair 401 forward and/or backward to their liking. The patron may then stand up from chair 401 and walk away. In the example embodiment, chair 401 is configured to wait a predetermined amount of time (e.g., 10 seconds) before automatically moving to the home position. After the predetermined amount of time elapses, linear actuator 702 is turned on in order to determine which direction to move chair 401 (e.g., based on sensor signals) and then to move screw 704 (e.g., and rail 710) in order to return chair 401 to the home position (e.g., as sensed by the at least one sensor in floorplate 414).

The exploded view of actuator system 700 shown in FIG. 9 further illustrates floorplate 414, a switch detector plate 902, linear actuator 702, a floor plate actuator mount 904, an actuator ball end 906, a micro switch 908, a PCB logic and power distribution module 910, a carriage actuator mount 912, a switch mount 914, slide rail 710 (e.g., a linear rail), side housing 708 (e.g., a linear rail mount), moveable plate 412 (e.g., a sliding carriage), and supporting structure 410 (e.g., a seat column).

In the example embodiment, switch detector plate 902 is an example of the at least one sensor coupled to floorplate 414 and is configured to sense/determine the position of chair 401 (or portion thereof) in order to facilitate movement of chair 401 back to a home position, as described herein. In some embodiments, positions of actuator 702 may be stored in a memory (e.g., a memory device) with respect to the predefined home position such that actuator 702 can be controlled to move chair 401 to the home position (e.g., with or without one or more sensors in plate 412).

Further, linear actuator 702 is coupled to floorplate 414 via mount 904 and also coupled to moveable plate 412 via mount 912. Mount 904 is also coupled to ball end 906. In the example embodiment, actuator 702 is also coupled to bearings to facilitate movement of the actuator in at least the first direction and the second direction as described herein. In some embodiments, floorplate 414 includes physical hard stops in place within the travel limits of actuator 702 to prevent movement of chair 401 past certain positions on floorplate 414 (e.g., to prevent contact of chair 401 and/or a patron seated in chair 401 with a gaming device that may cause damage, for example).

As described herein, screw 704 is controlled by actuator 702 to move in and out of member 706. As screw 704 moves in and out of member 706, rail 710 moves into and out of rail housing 712 and/or side housing 708 and/or actuator 702 moves on bearings moves back and forth. Because rail 710 is coupled to plate 412, supporting structure 410 and chair 401 attached thereto similarly move in accordance with rail 710, screw 704, and actuator 702.

Micro switch 908 is coupled to switch mount 914 and is configured to detect when chair 401 and/or a component of chair (e.g., plate 412) has reached a maximum position. In some embodiments, micro switch 908 may be used as an emergency stop and/or as a secondary feedback device to determine a position of chair 401 and/or plate 412. PCB logic and power distribution module 910 is coupled to and controls actuator 702 in accordance with the return to home features described herein. In some embodiments, module 910 is communicatively coupled (e.g., wired and/or wirelessly) to another device that transmits signals to module 910 to control system 700 and chair 401. For example, module 910 may be communicatively coupled to a server and/or gaming device (e.g., EGM, mobile device, etc.) as described herein.

Figure 10:
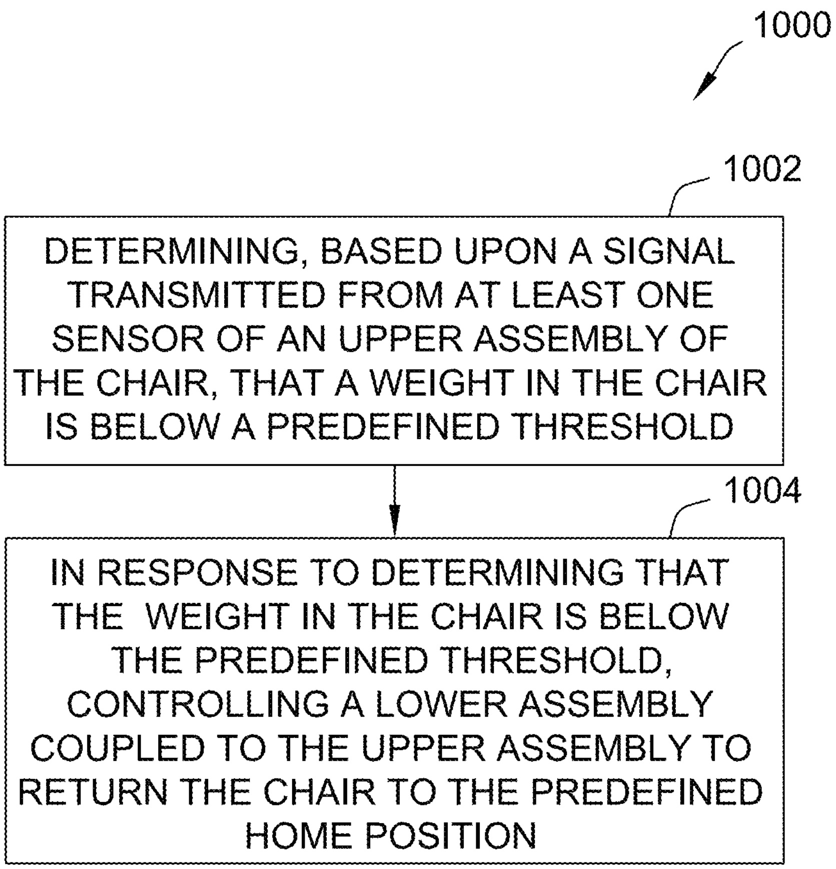
FIG. 10 illustrates an example method for returning a slidable gaming chair to a home position in accordance with the present disclosure.

FIG. 10 illustrates an example method 1000 for returning a slidable gaming chair to a predefined home position in accordance with the present disclosure. a method of returning a chair to a predefined home position is described. In the example embodiment, method 1000 includes determining 1002, by a processor, based upon a signal transmitted from at least one sensor of an upper assembly (e.g., upper assembly 402) of the chair, that a weight in the chair is below a predefined threshold. The method also includes, in response to determining that the weight in the chair is below the predefined threshold, controlling, by the processor, a lower assembly (e.g., lower assembly 404) coupled to the upper assembly to return the chair to the predefined home position. In some embodiments, method 1000 includes more, less, and/or alternative steps, in accordance with the present disclosure.

While system 700 is described as the example embodiment herein, it should also be appreciated that many other embodiments of implementing the return to home features described herein are envisioned. For example, in some embodiments, the return to home system may include elastic members (e.g., similar to bungee cords) that are controlled/configured to return chair 401 to a predefined home position once a player/patron has left the chair. In some embodiments, the return to home system may include other mechanical and/or electromechanical means to control chair 401 to return to a predefined home position. In some embodiments, a motor (e.g., a DC motor) coupled to a belt may be utilized in a system to control chair 401 to return to a predefined home position (e.g., wherein the belt is coupled to at least a portion of chair 401). In some embodiments, a ramp system (e.g., in place of and/or in addition to floorplate 414) may be utilized to tilt at least a portion of chair 401 to slide back to a predefined home position. In some embodiments, an electromagnet may be placed at/near a predefined home position and may control chair 401 to return to a home position when the electromagnet is turned on (e.g., wherein the electromagnet is turned off when a player is seated in chair 401). In some embodiments, the return to home system may include any number of different combinations of motors, gears, belts/chains, lead screw, or lever/pulley systems that could be used to return the chair to a predetermined location.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electronic gaming system including:

an upper assembly including a chair and at least one sensor; and a lower assembly coupled to the upper assembly by a support structure, wherein the lower assembly includes a centering system and a movable plate that is coupled to the centering system and slidably coupled to a floorplate, and wherein the centering system is configured to return the chair to a predefined home position in response to the at least one sensor of the upper assembly detecting a weight below a predefined threshold.

2. The electronic gaming system of claim 1, wherein the centering system is configured to control movement of the chair by controlling movement of the movable plate along the floorplate.

3. The electronic gaming system of claim 1, wherein the chair includes a controllable electronic component comprising at least one of: a speaker, a subwoofer, a shaker, or a back-side screen.

4. The electronic gaming system of claim 1, further comprising an electronic gaming device, wherein the electronic gaming device is communicatively coupled to the chair.

5. The electronic gaming system of claim 1, wherein the chair includes a seat cover configured for quick removal by being coupled to the chair with two screws.

6. The electronic gaming system of claim 1, wherein the lower assembly comprises another at least one sensor configured to detect when the chair has returned to the predefined home position.

7. The electronic gaming system of claim 1, wherein the lower assembly comprises a linear actuator configured to return the chair to the predefined home position.

8. The electronic gaming system of claim 7, wherein the linear actuator includes a back drive force configured to prevent back drive of a screw included in the linear actuator.

9. The electronic gaming system of claim 8, wherein the back drive force is at least 500 newtons (500N).

10. A chair comprising:

an upper assembly including a seat and at least one sensor; and a lower assembly coupled to the upper assembly by a support structure, wherein the lower assembly includes a centering system and a movable plate that is coupled to the centering system and slidably coupled to a floorplate, and wherein the centering system is configured to return the seat to a predefined home position in response to the at least one sensor of the upper assembly sensing that the chair is unoccupied.

11. The chair of claim 10, wherein the centering system is configured to control movement of the chair by controlling movement of the movable plate along the floorplate.

12. The chair of claim 10, wherein the chair includes a controllable electronic component comprising at least one of: a speaker, a subwoofer, a shaker, or a back-side screen.

13. The chair of claim 10, further comprising an electronic gaming device, wherein the electronic gaming device is communicatively coupled to the chair.

14. The chair of claim 10, wherein the chair includes a seat cover configured for quick removal by being coupled to the chair with two screws.

15. The chair of claim 10, wherein the lower assembly comprises another at least one sensor configured to detect when the chair has returned to the predefined home position.

16. The chair of claim 10, wherein the lower assembly comprises a linear actuator configured to return the chair to the predefined home position, and wherein the linear actuator includes a back drive force configured to prevent back drive of a screw included in the linear actuator.

17. The chair of claim 16, wherein the back drive force is at least 500 newtons (500N).

18. A method of returning a chair to a predefined home position, the method comprising:

determining, by a processor, based upon a signal transmitted from at least one sensor of an upper assembly of the chair, that a weight in the chair is below a predefined threshold; and in response to determining that the weight in the chair is below the predefined threshold, controlling, by the processor, a lower assembly coupled to the upper assembly to return the chair to the predefined home position, wherein the lower assembly comprises a centering system and a movable plate that is coupled to the centering system and slidably coupled to a floorplate.

* * * * *